US006598279B1

(12) United States Patent
Morgan

(10) Patent No.: US 6,598,279 B1
(45) Date of Patent: Jul. 29, 2003

(54) MULTIPLE CONNECTION SOCKET ASSEMBLY FOR SEMICONDUCTOR FABRICATION EQUIPMENT AND METHODS EMPLOYING SAME

(75) Inventor: Rodney D. Morgan, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/137,719

(22) Filed: Aug. 21, 1998

(51) Int. Cl.[7] ........................................ B23P 19/04

(52) U.S. Cl. .................. 29/402.08; 29/25.01; 29/426.1; 29/525.01; 439/195; 285/26; 285/29

(58) Field of Search .......................... 29/402.08, 426.1, 29/468, 525.01, 25.01; 439/191, 195, 362; 285/26, 29

(56) References Cited

U.S. PATENT DOCUMENTS

| | | | | | |
|---|---|---|---|---|---|
| 2,631,185 | A | * | 3/1953 | Earle et al. | 439/195 |
| 2,634,311 | A | * | 4/1953 | Darling | 439/195 |
| 3,085,219 | A | * | 4/1963 | Bass, Jr. | 439/195 |
| 3,110,537 | A | * | 11/1963 | Poetzsch et al. | 439/195 |
| 3,573,344 | A | * | 4/1971 | Snyder | 174/57 |
| 3,624,585 | A | * | 11/1971 | Kokalas et al. | 339/16 R |
| 3,673,541 | A | * | 6/1972 | Volinskie | 339/16 R |
| 3,888,518 | A | * | 6/1975 | Delessert | 285/39 |
| 3,915,541 | A | * | 10/1975 | Flegel | 339/119 R |
| 4,095,864 | A | * | 6/1978 | Hardin | 339/15 |
| 4,146,291 | A | | 3/1979 | Goff et al. | |
| 4,165,139 | A | * | 8/1979 | Asbill, III | 339/15 |
| 4,183,599 | A | * | 1/1980 | Wetzig | 339/15 |
| 4,352,532 | A | * | 10/1982 | Hardin | 339/15 |
| 4,486,060 | A | * | 12/1984 | Currall | 339/15 |
| 4,507,544 | A | | 3/1985 | Jones | |
| 4,621,398 | A | | 11/1986 | Kleiman | |
| 4,652,064 | A | * | 3/1987 | Cetrone | 339/16 R |
| 4,717,461 | A | | 1/1988 | Strahl et al. | |
| 4,751,372 | A | | 6/1988 | Fraas | |
| 4,785,608 | A | | 11/1988 | Debnam, Jr. et al. | |
| 4,840,574 | A | * | 6/1989 | Mills | 439/191 |

(List continued on next page.)

*Primary Examiner*—Gregory Vidovich
*Assistant Examiner*—Essama Omgba
(74) *Attorney, Agent, or Firm*—TraskBritt

(57) ABSTRACT

A multiple connection socket assembly for operatively associating semiconductor device fabrication equipment with a plurality of external facilities. The multiple connection socket assembly includes a connective structure configured to substantially simultaneously connect at least two different external facilities selected from a power supply, a computer, a vacuum, a chemical source, a source of water vapor, a source of liquid water, a pressurized air source, a hydraulic fluid source, and a ventilation system. The connective structure itself may include interconnectable first and second members with corresponding connector elements disposed on the faces of each member. The connector elements of the first member are in communication with various conduits extending from corresponding external facilities, and the connector elements of the second member are in communication with various conduits extending into corresponding components of the semiconductor device fabrication equipment, and the connector elements are arranged in such a way that when the first and second members are interconnected, the corresponding pairs of connector elements align and engage. When the connector elements disposed upon the faces of the first and second members are engaged, each of the conduits extending from the various external facilities and their corresponding conduits extending into the components of the semiconductor device fabrication equipment communicate. Thus, the multiple connection socket assembly facilitates the substantially simultaneous connection or disconnection of the semiconductor device fabrication equipment to or from a plurality of external facilities, thereby reducing the time necessary to connect or disconnect such equipment to and from the various external facilities.

8 Claims, 8 Drawing Sheets

U.S. PATENT DOCUMENTS

| | | | | | |
|---|---|---|---|---|---|
| 4,852,516 | A | | 8/1989 | Rubin et al. | |
| 5,083,364 | A | | 1/1992 | Olbrich et al. | |
| 5,221,360 | A | | 6/1993 | Thompson et al. | |
| 5,286,296 | A | | 2/1994 | Sato et al. | |
| 5,342,098 | A | * | 8/1994 | Wilkins | 285/26 |
| 5,538,437 | A | | 7/1996 | Bates, III et al. | |
| 5,636,320 | A | | 6/1997 | Yu et al. | |
| 5,637,006 | A | * | 6/1997 | Almeras | 439/191 |
| 5,762,745 | A | | 6/1998 | Hirose | |
| 6,099,599 | A | * | 8/2000 | Wu | 29/25.01 |
| 6,176,667 | B1 | * | 1/2001 | Fairbairn et al. | 414/217 |
| 6,238,161 | B1 | | 5/2001 | Kirkpatrick et al. | |
| 6,312,525 | B1 | * | 11/2001 | Bright et al. | 118/719 |
| 6,343,957 | B1 | * | 2/2002 | Kuo et al. | 439/638 |
| 6,406,315 | B1 | * | 6/2002 | Bates, III et al. | 439/310 |
| 6,425,416 | B1 | * | 7/2002 | Narita et al. | 137/625.27 |

* cited by examiner

MULTIPLE CONNECTION SOCKET ASSEMBLY FOR SEMICONDUCTOR FABRICATION EQUIPMENT AND METHODS EMPLOYING SAME

BACKGROUND OF THE INVENTION

1. Field of the Invention

The present invention relates generally to semiconductor device fabrication equipment. More specifically, the present invention relates to the use of a multiple connection socket assembly to associate various operational components of the semiconductor device fabrication equipment with various external support facilities. Particularly, the multiple connection socket assembly of the present invention facilitates the quick and simultaneous connection of a variety of external support facilities to, and disconnection of the same from, semiconductor device fabrication equipment, thereby increasing the efficiency with which non-functional semiconductor device fabrication, equipment may be serviced, repaired or replaced with functional equipment.

2. State of the Art

Typically, in semiconductor device fabrication facilities, the amount of time the fabrication equipment is operable and available to fabricate semiconductor devices is critical in determining whether large quantities of semiconductor devices may be fabricated at a relatively low cost. Typically, when the service, repair or replacement of conventional semiconductor device fabrication equipment is required, the various conduits thereof, such as the tubes, hoses, and cables (hereinafter referred to generally as "conduits"), which variously facilitate the communication of electricity, process gases, process chemicals (both liquid and vapor), water, hydraulic fluids, pressurized air, vacuums, ventilation systems and other external facilities to and from the fabrication equipment require individual disconnection therefrom and reconnection thereto. With fabrication equipment such as chemical vapor deposition (CVD) chambers, the separate disconnection and reconnection of such conduits for a chamber typically result in a lengthy down time of the fabrication equipment, which may be as much as forty-eight to seventy-two hours or more, exclusive of the amount of time required to service, repair, or replace the fabrication equipment. Following many types of repair or servicing of certain semiconductor device fabrication equipment, qualification (i.e., operational calibration) of the fabrication equipment may be required. Thus, it is typically not possible for personnel of a semiconductor device fabrication facility to replace or repair fabrication equipment such as deposition chambers in less than two or three days. Accordingly, when the replacement or repair of fabrication equipment is required, a fabrication facility typically suffers from a two to three day loss of production time, and thus throughput, during the removal of the non-functioning fabrication equipment from a clean room.

Because it is extremely cumbersome and time consuming to connect and disconnect the pieces of fabrication equipment to and from each of their various power lines, vacuum systems, chemical and gas management systems, etc., it is typically easier, more efficient and less costly for semiconductor device fabrication facilities to repair, service and qualify their fabrication equipment in-place in the clean room. However, this approach to service, or repair and requalification on of the fabrication equipment still results in an undesirable loss of production time, as well as jeopardizing the cleanliness of the clean room itself. Further, the in-place service, repair and validation of processing machinery does nothing to alleviate the loss of production time suffered by a fabrication facility when fabrication equipment remains in place, but out of service.

Thus, a method and apparatus are needed to drastically reduce the amount of time required to connect and disconnect semiconductor device fabrication equipment to and from the various external facilities that are required to properly operate the fabrication equipment. An apparatus is also needed which enables the quick removal and replacement of fabrication equipment in need of service, repair, or validation without jeopardizing the clean room environment of the fabrication facility.

SUMMARY OF THE INVENTION

The multiple-connection socket assembly of the present invention addresses each of the above-identified needs.

A first embodiment of the multiple connection socket assembly of the present invention, which is also referred to as a "socket assembly" for simplicity, includes a first member to which external conduits that communicate with various external equipment, which are also referred to as "facilities," are attached, and a second member to which a corresponding plurality of internally extending conduits that communicate power, electrical impulses, liquids, gases, vapors, etc. to or from various components of a piece of semiconductor device fabrication equipment, such as a chemical vapor deposition (CVD) chamber, is attached. The first and second members, which are also referred to as connective structures, of the multiple connection socket interconnect to align and connect corresponding external and internally extending conduits to each other.

Exemplary external conduits that may be attached to the first member include, without limitation, electrical wiring from an external power source, one or more vacuum lines from one or more external vacuum sources, one or more pressurized air lines from an external compressed air source, one or more computer communication bus lines from one or more external computers, chemical transport lines from external process chemical sources, gas transport lines from external process gas sources, input plumbing from an external water source, and exhaust and waste lines that lead to external waste collectors.

Correspondingly, the various internally extending conduits that are attached to the second member of the socket assembly communicate power, electrical impulses, liquid, gas, vapor, etc. to their respective destinations or from their respective sources within the fabrication equipment. The second member of the socket assembly may be fixed onto the body or frame of the fabrication equipment to prevent movement of the various internally extending conduits that are attached to the second member at their points of connection therewith, which movement may prevent damage to or disassociation of the internally extending conduits from the second member.

As noted previously, the first member and, therefore, the various external conduits associated therewith, interconnect with and are disconnectable from a second member of the socket assembly and, thus, the corresponding internally extending conduits attached thereto, by means of corresponding connectors of types known in the art (e.g., various configurations of male and female connectors', sealed abutment connections, etc.) that are associated with the first and second members. For example, electrical wires that are connected to the first and second members are interconnected by conductive connectors of a known type, such as electrically conductive prongs and receptacles. Similarly, lines that convey fluids, gases and vapors, such as water lines and various chemical lines, from their respective external sources, are interconnected to corresponding internally extending conduits of the fabrication equipment such as a CVD chamber by known fluid-tight sealing connectors that prevent the escape of liquid, vapor or gas from the connections.

As the first and second members are interconnected, the various connector elements of the first member substantially simultaneously align and mate with the corresponding connector elements of the second member. In order to ease the alignment and mating of the corresponding connector elements, the first and second members preferably include cooperative alignment elements. Since the inventive multiple connection socket assembly aligns and interconnects a plurality of conduits during a single interconnection operation of the first and second members, connection and disconnection times are significantly reduced when compared with the amount of time that would otherwise be required to connect or disconnect several separate conduits.

After the first and second members and the various corresponding connector elements are properly connected, the first and second members of the socket are secured to one another in a manner which maintains the connected relationship thereof and thus the connections of the corresponding connector elements associated with each conduit during operation of the fabrication equipment. Stated another way, the first and second members preferably remain interconnected and maintain, through the engaged connector elements, the secure interconnection of the various external and internally extending conduits as various operating pressures, such as the negative pressure that is conveyed through vacuum lines and the positive pressure of various liquids, gases and vapors that are transported through the conduits, are applied to the external and internally extending conduits. Appropriate locking mechanisms may be employed to maintain the first and second members in a secure relationship.

Included within the scope of the present invention is a method for associating semiconductor device fabrication equipment with the external facilities necessary to operate the equipment. Such a method includes associating a socket assembly adapted to provide connective capability with at least two of the following external facilities: a power source, a vacuum source, a computer, a chemical source, a liquid or vapor water source, an external waste collector, a hydraulic fluid source, a source of pressurized air, or any other external facility necessary to operate the fabrication equipment, and associating the multiple connection socket assembly with a piece of semiconductor device fabrication equipment.

A second embodiment of the inventive socket assembly may be used in conjunction with modular semiconductor device fabrication systems, which include a mainframe fabrication station, which is also referred to as a "base" or a "port," and one or more modules, or pieces of semiconductor device fabrication equipment or treatment components operating cooperatively with the mainframe fabrication station. This embodiment of the inventive socket assembly includes first and second members, which are substantially similar to the first and second members of the first embodiment. However, the first member of this embodiment is disposed upon the mainframe fabrication station of a modular fabrication system and the second member is disposed upon a modular chamber or other component of the fabrication system operatively associated with the mainframe fabrication station. The various external conduits associated with a first member may be routed from their corresponding sources or destinations through the mainframe station to the first member at a connection location for a modular chamber or other component which has associated therewith a corresponding second member, and the first and second members of this embodiment are disposed upon their respective elements of the modular fabrication system in such a way that when the modular chamber or component aligns with the mainframe fabrication station, the first member and the second member of the inventive socket assembly and, thus, the various corresponding connector elements associated with each, also align.

Due to the typical association of a common mainframe with a plurality of modules of fabrication equipment in state of the art fabrication facilities, this embodiment of the inventive socket assembly is particularly useful. In conventional systems which include a plurality of modules, if one module requires repair, that module and possibly one or more other modules associated with the same mainframe may have to be shut down as the inoperable module is repaired. Accordingly, the inventive socket assembly is particularly useful because it facilitates the rapid disconnection and replacement of inoperable modules with other modules, replacement modules, which are operable and which have been prequalified, thereby minimizing any loss of throughput in the entire fabrication system.

A third embodiment of the inventive socket assembly includes a first member, which is substantially the same as that described in relation to the first embodiment, and a second member that has been retrofitted with at least some of the various internally extending conduits of the semiconductor device fabrication equipment. The various electrical, liquid, gas, and/or vapor conduits of the semiconductor device fabrication equipment that connect various components of the equipment with external equipment or other external facilities are associated with corresponding connector elements on the second member. Thus, rather than requiring individual interconnection to their respective external equipment or conduits extending therefrom, various conduits of the fabrication equipment may be interconnected to their corresponding external conduits by a single interconnection of the first and second members of the multiple connection socket.

Accordingly, a method of retrofitting a price of semiconductor device fabrication equipment with a multiple connection socket assembly is also within the scope of the present invention. The retrofitting method includes securing a free end of each of a plurality of internally extending conduits associated with a piece of fabrication equipment; attaching the free ends of each of the plurality of internally extending conduits to a connector element of a second member of a multiple connection socket assembly; providing a plurality of connector elements on a first member of the socket assembly that correspond to, align with, and connect to the connector elements of the second member; and attaching free ends of corresponding external conduits that are in communication with external equipment or facilities to their respective connector elements of the first member of the socket.

Because the inventive socket assembly allows the rapid connection and disconnection of semiconductor device fabrication equipment to and from the various external facilities required to operate the equipment, the inventive socket assembly not only enables the quick removal and replacement of fabrication equipment which has become inoperable, it also enables a method which includes using the inventive socket assembly to routinely service and preventively maintain semiconductor device fabrication equipment. In one aspect, this method includes a preventive maintenance program wherein the members of the socket assembly associated with the fabrication equipment are disconnected; the fabrication equipment is removed from the clean room; the various parts and mechanisms of the fabrication equipment are serviced or replaced before the expiration of their predicted life-span; the fabrication equipment is returned to the clean room; and the members of the socket assembly associated with the equipment are reconnected. Such a method of routinely servicing and maintaining the fabrication equipment in accordance with a preventative maintenance program will reduce overall downtime or sub-optimal operation, reduce the product and resource loss associated therewith and reduce the likelihood of catastrophic failure of the fabrication equipment. In addition, by rotating pieces of fabrication equipment through a maintenance cycle, downtime can be minimized by immediately replacing a piece of equipment to be serviced with one which as been serviced and qualified. Further, in the case of modular equipment, modules associated with a mainframe station may be similarly rotated out of and back into service with little loss of operational time in the system.

Although the inventive socket assembly and the methods falling within the scope of the present invention are described with regard to certain preferred embodiments, these embodiments are discussed for illustrative purposes only. As those in the art will appreciate, the multiple connection socket assembly of the present invention is useful in association with other types of equipment associated with the fabrication of semiconductor devices, such as sputtering chambers, etchers, washers, dryers, plunge-up heads, pick-up heads, packaging equipment, and testing equipment. Moreover, other advantages of the multiple connection socket of the present invention will become apparent to those of skill in the art through a consideration of the ensuing description, the accompanying drawings, and the appended claims.

DETAILED DESCRIPTION OF THE PREFERRED EMBODIMENTS

Figure 1:
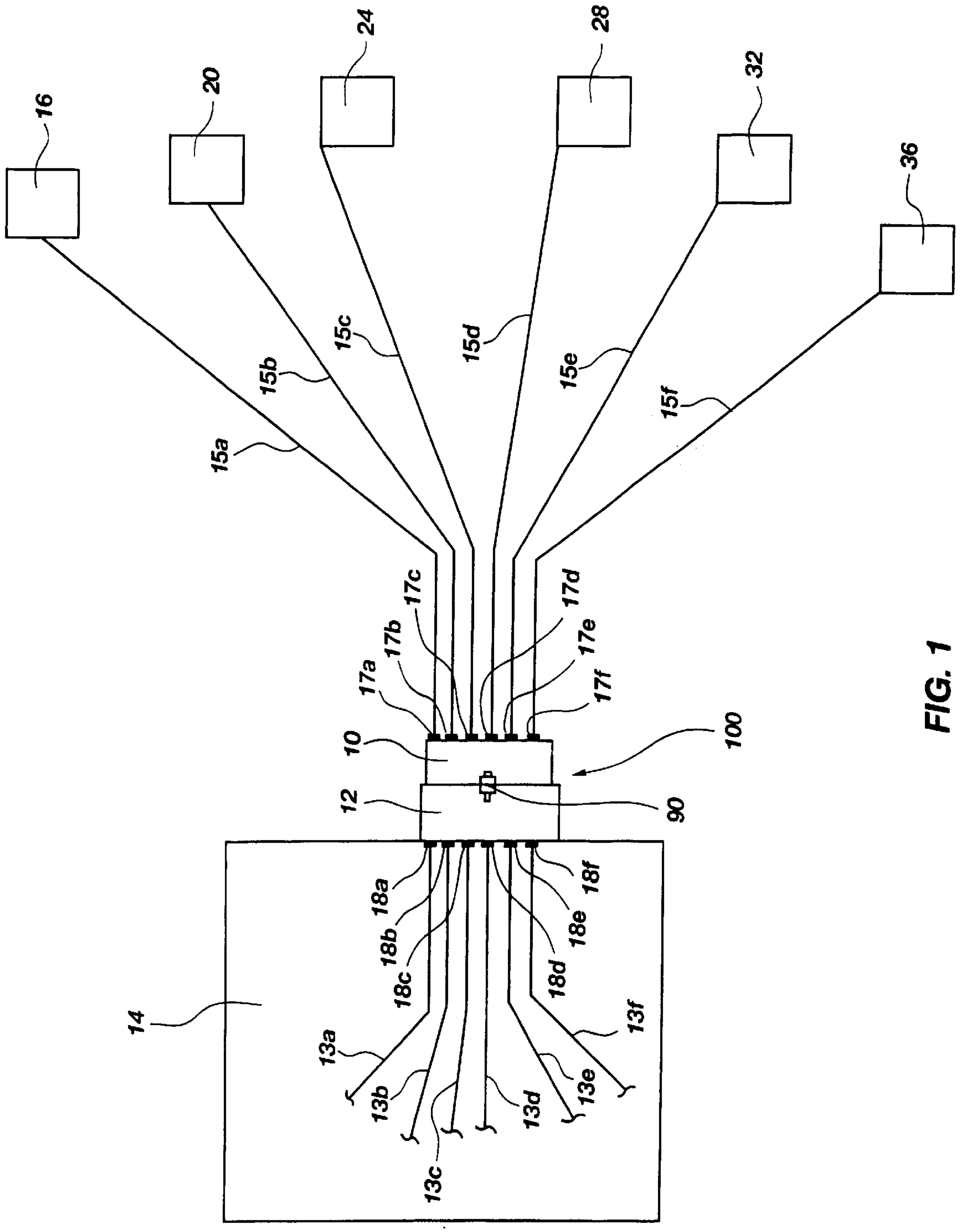
FIG. 1 is a schematic representation of a first embodiment of the multiple connection socket assembly according to the present invention.

FIG. 1 is a schematic illustration of a preferred embodiment of a multiple connection socket assembly 100 according to the present invention. The socket assembly 100 includes a first member 10 and a second member 12 connectable to the first member. The multiple connection socket assembly 100 may also include a securing mechanism 90 that secures first member 10 and second member 12 to one another. The first member 10 is attached to various external conduits 15*a*–15*f* at corresponding connectors 17*a*–17*f* of types known in the art, such as one of a pair of mating electrical connectors, male/female fluid connectors, or sealed abutment-type fluid connectors. Exemplary external conduits include, without limitation, electrical wiring 15*a* from an external power source 16, a vacuum line 15*b* from an external vacuum source 20, computer communication bus lines 15*c* from an external computer 24, chemical transport lines 15*d* from one or more external chemical sources 28, plumbing 15*e* from an external water source 32, and exhaust or waste lines 15*f* leading to an external exhaust or waste collector 36.

The second member 12 is connected to various internally extending conduits 13*a*–13*f*, which service the various components of a semiconductor device fabrication apparatus, such as a chemical vapor deposition ("CVD") chamber 14. The internally extending conduits 13*a*–13*f* are attached to the second member at connectors 18*a*–18*f* that correspond and matingly connect to connectors 17*a*–17*f*, respectively. Preferably, the second member 12 is fixed onto the body or frame of the CVD chamber 14. Fixing the second member 12 to the body or the frame of the CVD chamber 14 may prevent movement of the various internally extending conduits 13*a*–13*f* that service the CVD chamber 14 at their points of connection with the second member 12, and thereby serve to prevent damage to the internally extending conduits 13*a*–13*f* or dissociation of the same from the second member 12.

Figure 2:
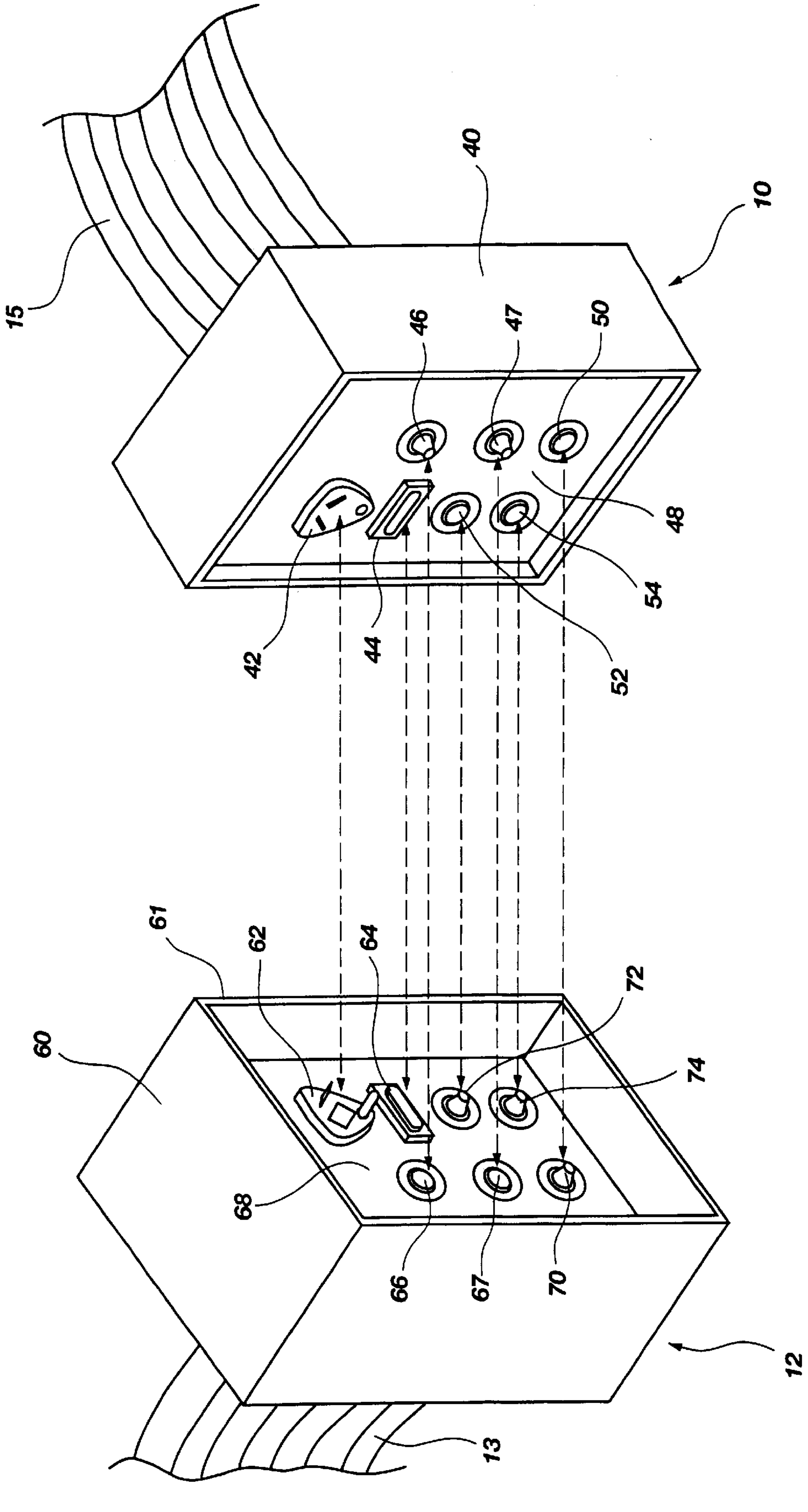
FIG. 2 is a perspective view of a first member and a second member of the multiple connection socket assembly of FIG. 1, illustrating corresponding elements of the connectors of each of the first and second members of the socket assembly.

With reference to FIG. 2, the first member 10 may be connected to the second member 12 by aligning the connectors 17*a*–17*f* (shown in FIG. 1), which may also be referred to as connector elements, exposed on the face 48 of the first member 10 with their corresponding connectors 18*a*–18*f* (shown in FIG. 1), which may also be referred to as connector elements, exposed on the face 68 of the second member 12, and engaging the first and second members in a face-to-face relationships, so that corresponding connector elements matingly engage one another. Upon interconnecting the first member 10 and the second member 12 and, therefore, the corresponding pairs of connectors 17*a*–17*f* and 18*a*–18*f*, each of the external conduits 15*a*–15*f* (collectively shown as "15" in FIG. 2) and their respective internally extending conduits 13*a*–13*f* (collectively shown as "13" in FIG. 2) are operatively connected. Therefore, by the interconnection of the two members of the inventive socket assembly, the various internally extending conduits 13*a*–13*f* and their corresponding external conduits 15*a*–15*f* are united. Thus, various components of the CVD chamber 14 are placed in communication with their corresponding external support facilities 16, 20, 24, 28, 32, and 36 (see FIG. 1).

The first member 10, as is illustrated in FIG. 2, includes a housing 40 that resists deformation or degradation that may otherwise be caused by the operating temperatures of the fabrication equipment 14 (see FIG. 1), the chemicals, wastes, and electrical impulses that are conveyed through the socket assembly 100, and the pressures and temperatures of any matter conveyed therethrough. The receptacle element 42 of an electrical socket, the female element 44 of a computer serial port, the male elements 46 and 47 of fluid sealing connectors, and the female elements 50, 52 and 54 of fluid sealing connectors are each associated with and exposed on the face 48 of the first member 10. Male elements 46 and 47 and female elements 50, 52, and 54 may connect corresponding conduits 13 and 15 that convey matter, such as chemicals (liquid, vapor or gaseous), wastes (liquid, vapor or gaseous), water, or vacuum or positive air pressure to and from fabrication equipment 14 (see FIG. 1). The face 48 of the first member 10 may extend outwardly from the housing 40 and have smaller peripheral dimensions than the housing 40.

With continued reference to FIG. 2, the second member 12 includes housing 60 which, like the housing of the first member, is resistant to deformation or degradation. The prong element 62 of an electrical socket, the male element 64 of a computer serial port, the female elements 66 and 67 of fluid sealing connectors, and the male elements 70, 72, and 74 of fluid sealing connectors are each positioned on the face 68 of the second member 12 in such a manner that when the first member 10 and the second member 12 are connected, elements 62, 64, 66, 67, 70, 72, and 74 align with their corresponding elements 42, 44, 46, 47, 50, 52, and 54, respectively. As the first member 10 and the second member 12 are connected, the two corresponding elements of each of the various connectors will connect.

Preferably, the face 68 of the second member 12 is recessed within the housing 60, such that a lip 61 extends about the periphery of the face 68. The lip 61 extends approximately the same distance from the face 68 of the second member 12 as the face 48 of the first member 10 extends from the housing 40 thereof, so that the face 68 of the second member 12 receives the face 48 of the first member 10. Alternatively, rather than having a face 48 that extends from the housing 40, the housing 40 of the first member 10 may be dimensioned (as shown) to be insertable into the recess of the second member 12. Thus, lip 61 facilitates alignment of the first member 10 and the second member 12 and the interconnection of the various elements of the connectors associated therewith that correspond to the various conduits.

Figure 3:
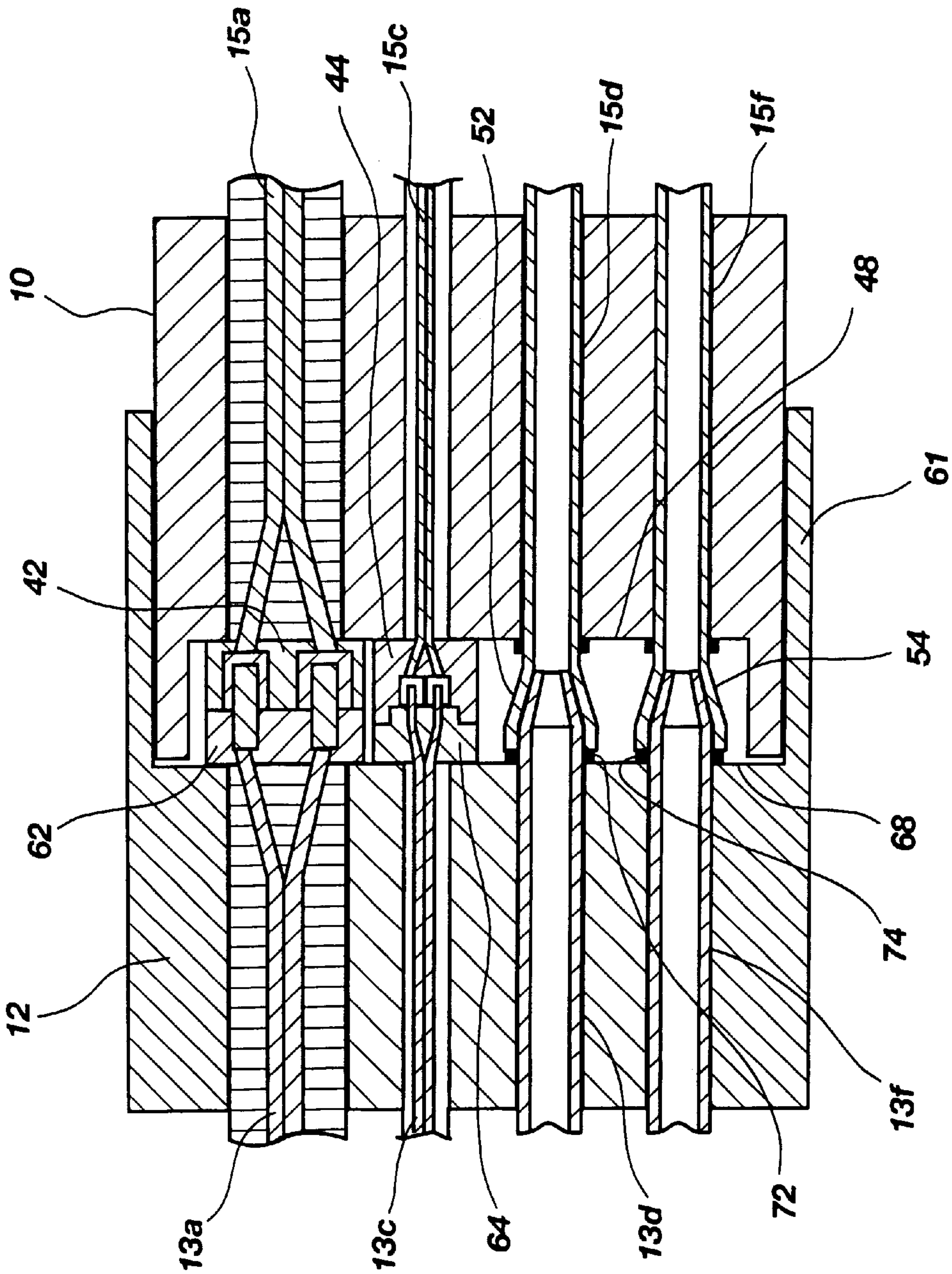
FIG. 3 is a cross-sectional view which illustrates the internal relationship of the various connector elements associated with the first and second members of the multiple connection socket assembly of FIG. 1 when the first and second members are interconnected.

FIG. 3 is a cross-sectional view which illustrates the connection of the first member 10 and the second member 12 and shows how the corresponding elements 42, 44, 52, 54 and 62, 64, 72, 74, respectively, of each of the connectors connect the various internally extending conduits 13*a*, 13*c*, 13*d*, and 13*f*, and external conduits 15*a*, 15*c*, 15*d*, and 15*f*, respectively. As the first member 10 and the second member 12 are positioned face 48-to-face 68, the corresponding elements of each of the connectors align. As the first member 10 and the second member 12 are connected, corresponding connector elements are operatively connected to each other.

When the first member 10 and the second member 12 of the socket assembly 100 are connected to one another, the various connector elements that are subjected to positive and negative pressures thereafter temperature fluctuations and exposed to various chemicals will withstand such stresses and remain connected.

Figure 6A:
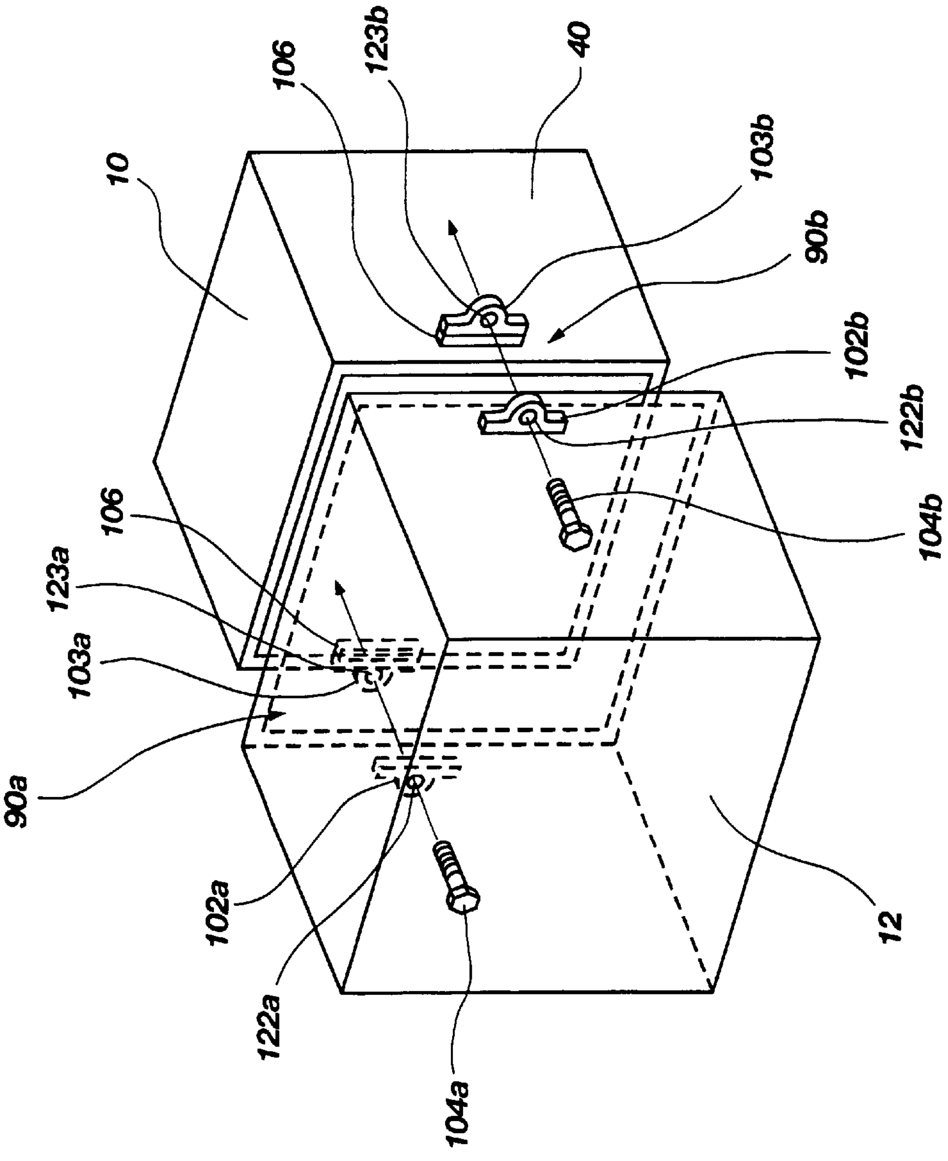
FIGS. 6*a*–6*c* illustrate various elements for securing the first and second members of the inventive multiple connection socket assembly in an interconnected relation to one another.
Figure 6C:
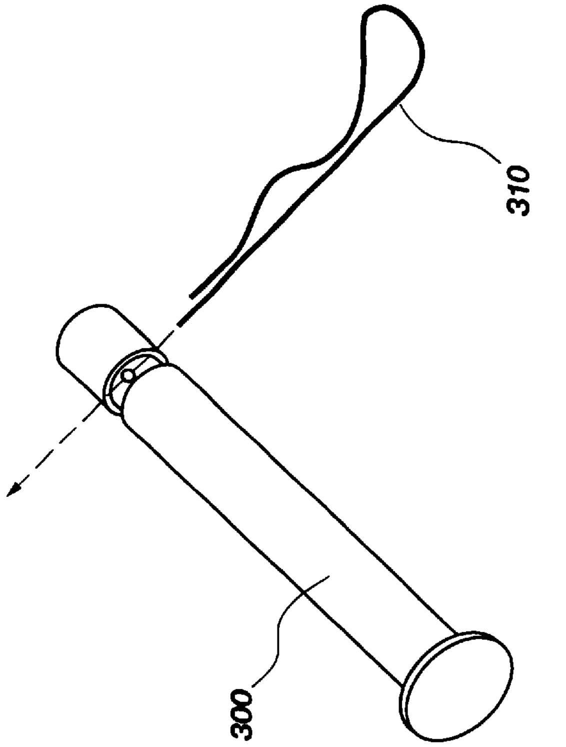

In order to ensure that the first member 10 and second member 12 remain connected during the operation of the semiconductor device fabrication equipment 14, a securing component may be provided on the housings 40, 60 of the first member 10 and the second member 12, respectively. The securing component illustrated in FIG. 6*a* secures the first member 10 to the second member 12. Each securing component 90*a* and 90*b* includes two elements 102*a*, 103*a* and 102*b*, 103*b*, respectively. The securing components 90*a* and 90*b* are preferably disposed on opposing sides of the socket assembly 100. Element 102*a* of securing component 90*a*, which includes an aperture 122*a* therethrough, may be mounted on the second member 12, wile the corresponding element 103*a* of securing component 90*d*, which also includes an aperture 123*a* that preferably includes internal threading, is disposed on the other, first member 10. Similarly, elements 103*b* and 102*b* may be disposed upon the first member 10 and the second member 12 in another location, such as the top and bottom thereof. The elements 102*a*, 103*a* and 102*b*, 103*b* may be welded, riveted, bonded, bolted or otherwise secured to the sides of the first and second members. The elements 102*a*, 103*a* and 102*b*, 103*b* may alternatively be formed as integral parts of the housing 40, 60 (see FIG. 2) of the members. The elements 102*a*, 103*a* and 102*b*, 103*b* are positioned on the respective first or second member of socket 100 in such a way that when the two members are connected, the apertures 122*a*, 123*a* of elements 102*a* and 103*a* and the apertures 122*b*, 123*b* of elements 102*b* and 103*b* align, and elongated members 104*a*, 104*b*, such as a bolt that is threaded complementary to the threading of the apertures 123*a*, 123*b* of each of element 163*a*, 103*b*, a bolt 300 that is secured by a cotter pin 310 (see FIG. 6*c*), or any other elongated member that will secure elements 102*a*, 103*a* and 102*b*, 103*b* together, is inserted into apertures 122*a*, 122*b*, 123*a*, 123*b* in order to secure the first member 10 and the second member 12 to each other. When the housing 40 of the first member 10 is insertable into the face receptacle of the second member 12, elements 102*a*, 102*b*, 103*a* or 103*b* may include a spacer 106, which positions their respective apertures 122*a*, 122*b*, 123*a*, 123*b* at a height sufficient to ensure the proper alignment of corresponding apertures as the first member 10 and the second member 12 are connected.

Figure 6B:
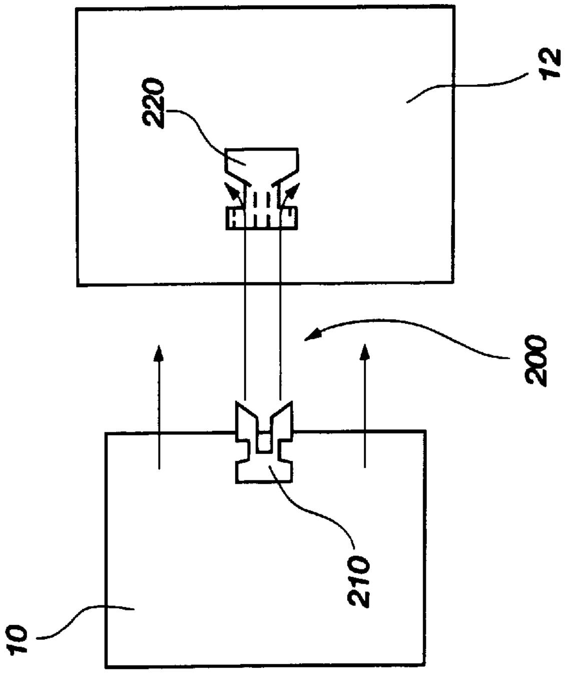

FIG. 6*b* illustrates another securing component that may be used to maintain the connection of first member 10 and second member 12 during the operation of the fabrication equipment. This securing component 200 is a self-locking clip, such as a SIDE SQUEEZE™ clip manufactured by National Molding in Farmingdale, N.Y., that includes a female element 210 and a male element 220. The two elements 210, 220 engage and lock together as the first member 10 and the second member 12 are interconnected, and the two elements may be made of any semi-flexible metal, plastic, or composite material, a preferred material being one which minimizes electrostatic discharged (ESD).

Figure 4:
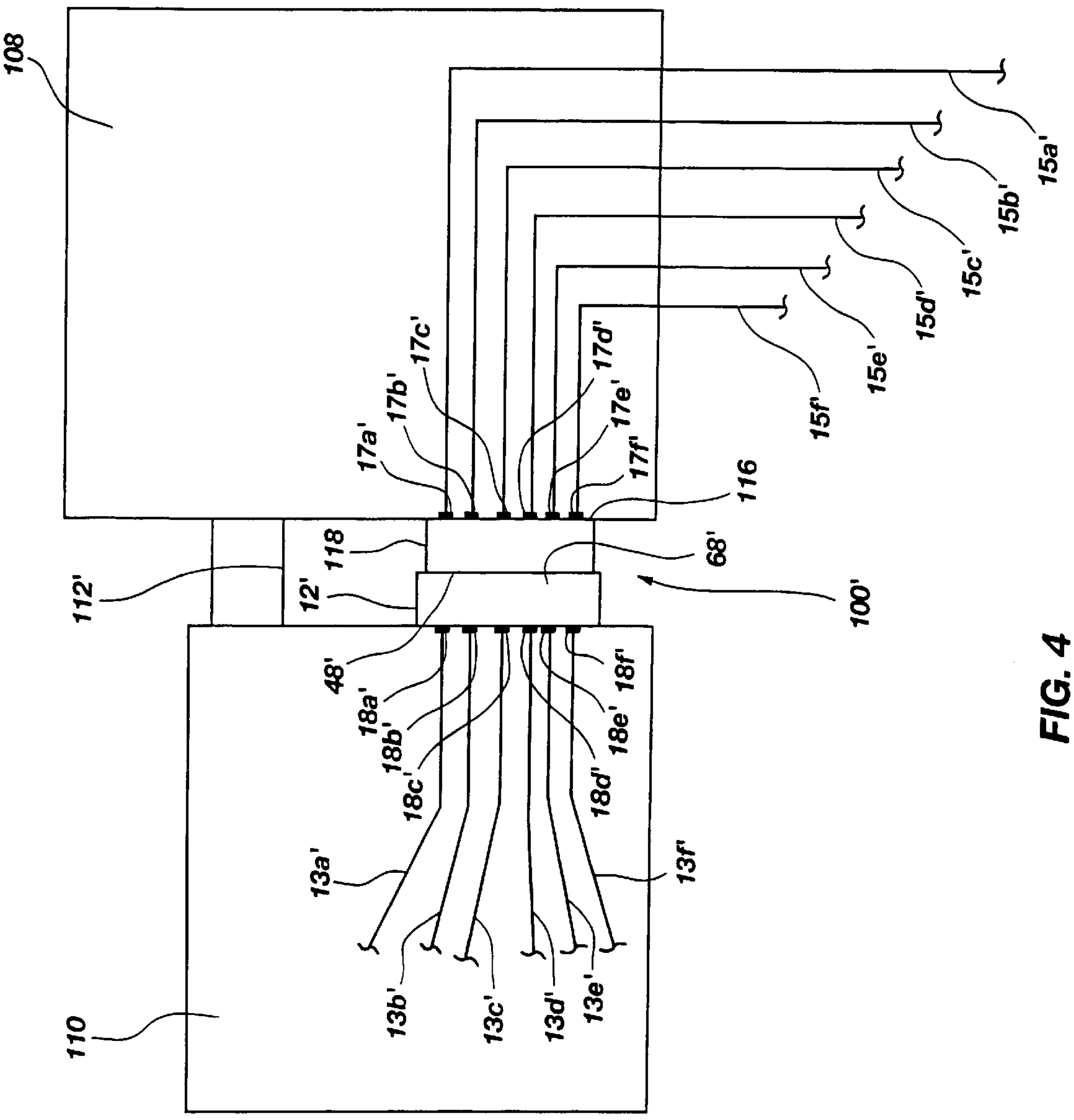
FIG. 4 is a schematic side view representation of a second embodiment of the multiple connection socket assembly according to the present invention, illustrating the functional connection, via the multiple connection socket assembly, of a chemical vapor deposition ("CVD") chamber to a clean room mainframe station, through which at least one piece of fabrication equipment is accessible.

An inventive socket assembly 100 may also be employed to operatively connect a piece, or module, of semiconductor device fabrication equipment or a modular semiconductor device treatment component to various external facilities through mainframe fabrication station, through which semiconductor wafers (e.g., silicon, gallium arsenide, indium phosphide) or other substrates (e.g., silicon on insulator (SOI), silicon on glass (SOG), or silicon on sapphire (SOS)) may be inserted into or removed from the tool. FIG. 4 is a schematic illustration depicting a second embodiment of a multiple connection socket assembly 100 according to the present invention which may be employed to operatively connect semiconductor device fabrication equipment, such as a CVD chamber 110, to various external facilities through a mainframe fabrication station 108. In the present embodiment, the various components of the first member 118 and the second member 12 may be largely the same as those previously discussed in reference to the first member 10 and the second member 12 of FIGS. 1–3. That is, the second member 12 is connected to various internally extending conduits 13*a*–13*f* that service the various components of the CVD chamber 110, and the various conduits may be secured to the second member 12 at corresponding connector elements 18*a*–18*f* of types known in the art.

The first member 118, however, is disposed on the mainframe fabrication station 108. All of the external conduits 15*a*'–15*f*' that lead from various external facilities may be routed from their corresponding sources, through mainframe fabrication station 108, to the rear of an external panel 116 thereof, and into the first member 118 of the socket assembly 100', to which the conduits are secured at connector elements 17*a*'–17*f*', of types known in the art.

The second member 12' may be disposed on the CVD chamber 110 and the first member 118 may be disposed on the mainframe fabrication station 108 so that when the CVD chamber 110 is aligned with and operatively connected to the mainframe fabrication station 108, the first member 118 and the second member 12' connect, and the corresponding connector elements 17*a*'–17*f*' and 18*a*'–18*f*' that are associated with the abutting faces 48', 68' of the first member 118 and the second member 12', respectively, are aligned and the connector elements on face 48' interconnect with their corresponding connector elements on face 68'. The first member 118 and the second member 12' may be secured together by a securing component such as those described above in reference to FIGS. 6*a*–6*c*. Consequently, simply by bringing the CVD chamber 110 into alignment and abutment with the mainframe fabrication station 108 so that the wafer pass-through 112' of the mainframe fabrication station 108 aligns with a door of the CVD chamber 110, all of the external conduits 15*a*'–15*f*' are operatively connected to their corresponding internally extending conduits 13*a*'–13*f*'. Thus, the embodiment illustrated in FIG. 4 provides a simple and efficient system for connecting semiconductor device fabrication equipment to various external devices or facilities.

Figure 7:
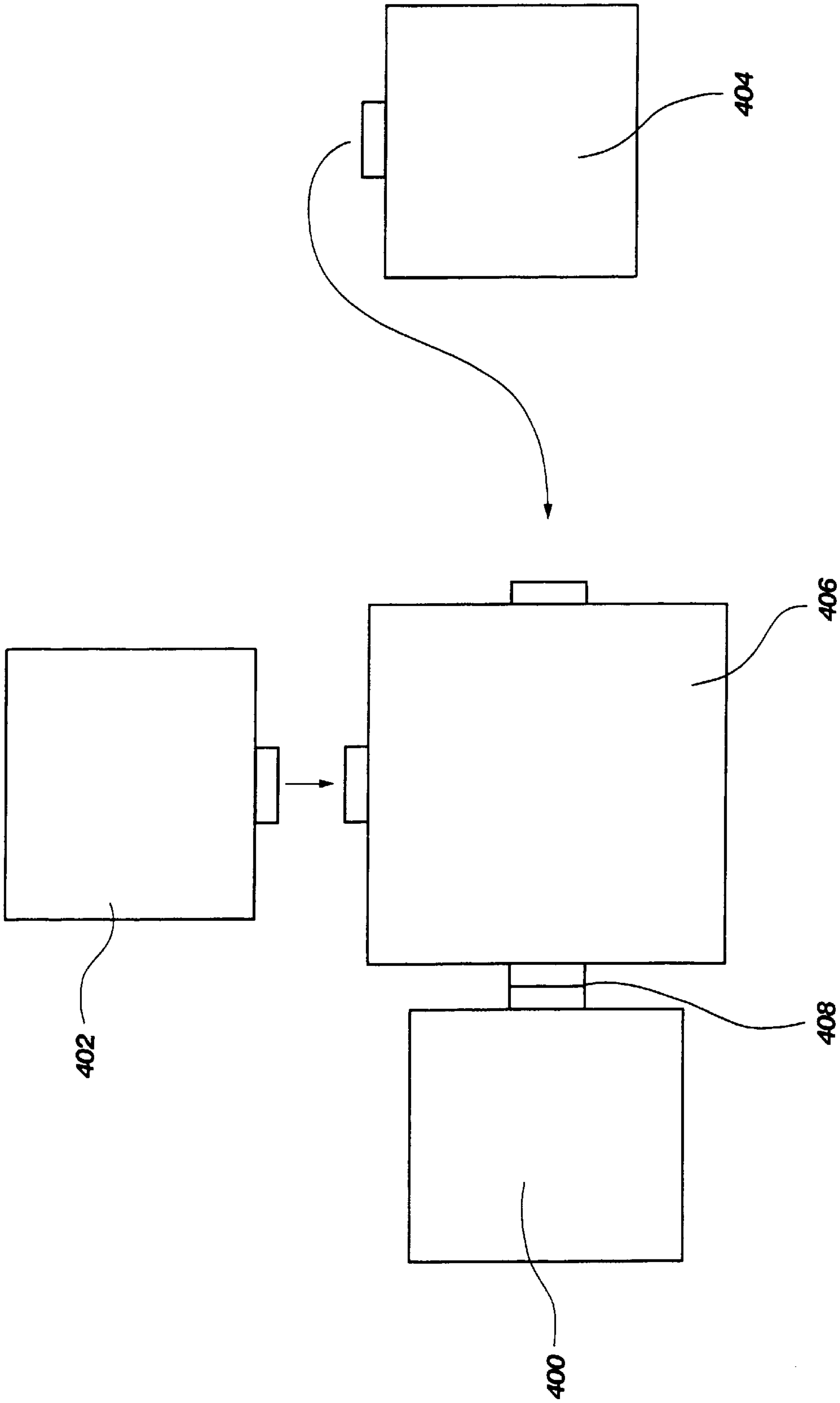
FIG. 7 is a schematic representation of a top view of a semiconductor device fabrication system including modular semiconductor device fabrication equipment and a mainframe fabrication station.

FIG. 7 is a schematic representation of a top view of a semiconductor device fabrication system including modular semiconductor device fabrication equipment 400, 402 and 404 and a mainframe fabrication station 406. FIG. 7 illustrates the different modular semiconductor device fabrication chambers 400, 402 and 404 in various stages of alignment and operative connection with the mainframe fabrication station 406. One chamber 400 is operatively connected with the mainframe fabrication station 406, as illustrated by the aligned and connected wafer pass-through 408. The second chamber 402 has been aligned with and is ready for operative association with the mainframe fabrication station 406, and the third chamber 404 is being aligned with the mainframe fabrication station 406 in preparation for operative association.

Figure 5:
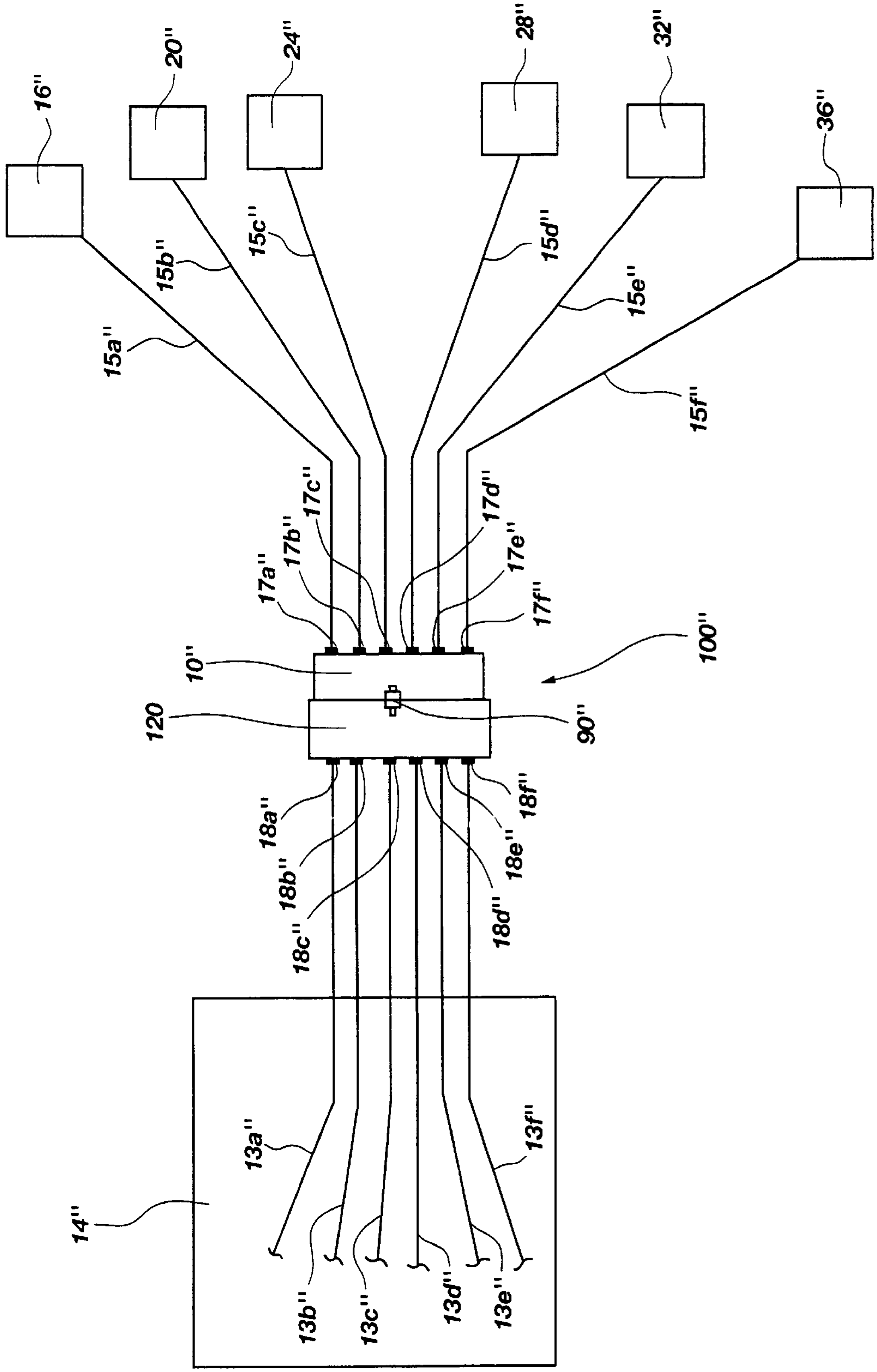
FIG. 5 is a schematic representation of a third embodiment of the present invention, in which a multiple connection socket assembly has been retrofitted to a piece of semiconductor device fabrication equipment.

FIG. 5 is a schematic illustration of another embodiment of the inventive socket assembly 100", which includes a first member 10" and a second member 120. The first member 10" is similar to that described above in reference to FIGS. 1–3, and may include similar components. That is, the first member includes various connector elements 17*a*"–17*f*", as known in the art, that attach various corresponding conduits 15*a*"–15*f*" to the first member 10". Conduits 15*a*"–15*f*" effect the communication of various external support facilities, such as an external power supply 16", or external vacuum supply 20", one or more external computers 24", one or more external chemical supplies 28", an external water supply 32", or external exhaust and waste gathering equipment 36", with the first member 10".

A piece of semiconductor device fabrication equipment, such as a CVD chamber 14, may be retrofitted with the second member 120 by attaching at least some, and preferably all, of the internally extending conduits 13*a*–13*f* of the CVD chamber 14 to the second member 120. Similarly, the first member 10 (see FIGS. 1–3) may be connected by connector elements 17*a*–17*f* of types known in the art to various external conduits 15*a*–15*f* that correspond to internally extending conduits 13*a*–13*f* and associated connector elements 18*a*–18*f*. Thus, this embodiment facilitates the connection of an existing piece of semiconductor device fabrication equipment to external support facilities via a multiple connection socket 100.

With continued reference to FIG. 5, a method of retrofitting a piece of semiconductor device fabrication equipment with a multiple connection socket is also within the scope of the present invention. The retrofitting method includes securing a free end of each of a plurality of internally extending conduits which services a piece of fabrication equipment; attaching the free end of each of the plurality of internally extending conduits to a second member of a multiple connection socket by corresponding connectors of types known in the art; providing a plurality of connector elements on the face of a second member of the socket that correspond to, align with, and mate with the connector elements on the face of the first member; and attaching the free ends of corresponding external conduits that are in communication with external equipment or facilities to the first member by corresponding connectors of types known in the art.

While specific embodiments of the socket assembly of the present invention have been described, such as stand-alone CVD chambers, CVD chambers operating in conjunction with a mainframe fabrication station, and retrofitted fabrication equipment, the inventive socket assembly may also be used to connect other types of semiconductor device fabrication equipment (e.g., sputtering chambers, etchers, washers, dryers, plunge-up heads, pick-up heads, etc.) to external equipment or facilities. Similarly, simultaneous connections a of plurality of conduits which conveys a variety of facilities other than electricity, fluids, gases, exhaust, waste, and vacuum pressure may also be made by a socket assembly and remain within the scope of the present invention. Thus, while the invention has been described with reference to certain preferred embodiments and examples, these are for illustrative purposes only, and the scope of the invention is to be determined in view of the appended claims and their legal equivalents. All additions, deletions and modifications to the invention as disclosed herein which fall within the meaning and scope of the claims are to be embraced within their scope.

What is claimed is:

1. A method of maintaining a semiconductor device fabrication system, the method comprising:

arranging at least two semiconductor device fabrication modules about a semiconductor device fabrication system base such that said at least two semiconductor device fabrication modules are coupled with said semiconductor device fabrication system base and are mutually remotely located on different angularly disposed sides of a periphery of said semiconductor device fabrication system base and such that at least one of said at least two semiconductor device fabrication modules is coupled with said semiconductor device fabrication system base so as to convey a semiconductor wafer therebetween through a wafer pass-through;

substantially simultaneously disconnecting the wafer pass-through and a plurality of conduits for communicating at least two different facilities between said semiconductor device fabrication system base and at least one semiconductor device fabrication module of said at least two modules;

removing said at least one semiconductor device fabrication module from the semiconductor device fabrication system base;

replacing a component of the at least one semiconductor device fabrication module in accordance with a maintenance program; and maintaining at least one other semiconductor device fabrication module of said at least two modules in an operable state while replacing said at least one semiconductor device fabrication module.

2. The method of claim 1, further comprising replacing said at least one semiconductor device fabrication module with another, like semiconductor device fabrication module.

3. The method of claim 2, further comprising reconnecting said plurality of conduits between the base and the another module.

4. The method of claim 1, wherein said substantially simultaneously disconnecting comprises dissociating a first member of a multiple connection socket assembly from a second member of said multiple connection socket assembly.

5. The method of claim 4, further comprising substantially simultaneously reconnecting said first member and said second member.

6. The method of claim 5, wherein reconnecting said first member and said second member includes securing said first member and said second member with an electrostatic discharge resistant securing device.

7. The method of claim 1, wherein said at least two different facilities are selected from a power supply, a computer, a vacuum source, a process liquid source, a process gas source, a source of water vapor, a source of liquid water, a pressurized air source, a hydraulic fluid source, and a ventilation source.

8. The method of claim 1, further comprising replacing said at least one semiconductor device fabrication module on said base; and substantially simultaneously reconnecting said plurality of conduits.

* * * * *

UNITED STATES PATENT AND TRADEMARK OFFICE

CERTIFICATE OF CORRECTION

PATENT NO. : 6,598,279 B1
DATED : July 29, 2003
INVENTOR(S) : Rodney D. Morgan

It is certified that error appears in the above-identified patent and that said Letters Patent is hereby corrected as shown below:

Column 1,
Line 21, delete the comma after "fabrication"

Column 2,
Line 58, delete the comma after "therewith"
Line 61, delete the comma after "thereto"
Line 63, change "connectors'," to -- connectors, --

Column 4,
Line 12, delete the comma after "each"
Line 44, change "price" to -- piece --

Column 6,
Line 33, after "member" and before "at" insert -- 12 --
Line 52, change "relationships" to -- relationship --

Column 7,
Lines 2 and 15, change "fabrication equipment" to -- CVD chamber --
Line 53, delete the comma after "13f"
Line 61, change "thereafter" to -- and --

Column 8,
Line 1, change "fabrication equipment" to -- CVD chamber --
Line 12, change "90d" to -- 90a --
Line 30, change "163a" to -- 103a --
Lines 54 and 64, change "100" to -- 100' --

Column 9,
Lines 3, 6, and 9, change "12" to -- 12' --
Line 7, change "13a-13f" to -- 13a'-13f' --
Line 10, change "18a-18f" to -- 18a'-18f' --
Line 67, before "external" change "or" to -- an --

UNITED STATES PATENT AND TRADEMARK OFFICE

CERTIFICATE OF CORRECTION

PATENT NO. : 6,598,279 B1
DATED : July 29, 2003
INVENTOR(S) : Rodney D. Morgan et al.

It is certified that error appears in the above-identified patent and that said Letters Patent is hereby corrected as shown below:

<u>Column 10,</u>
Line 6, change “14,” to -- 14", --
Line 8, change “13a-13f” to -- 13a”-13f” --
Line 9, change “14” to -- 14" --
Line 10, change “10” to -- 10" --
Line 11, change “17a-17f” to -- 17a"-17f" --
Line 12, change “15a-15f” to -- 15a"-15f" --
Line 13, change “13a-13f” to -- 13a"-13f" --
Line 14, change “18a-18f” to -- 18a"-18f" --
Line 17, change “100” to --100" --*
Line 44, change “a of” to -- of a --

Signed and Sealed this

Twenty-second Day of June, 2004

JON W. DUDAS
*Acting Director of the United States Patent and Trademark Office*